United States Patent [19]

Pavie

[11] Patent Number: 4,542,818

[45] Date of Patent: Sep. 24, 1985

[54] DISPLACEMENT BENCH FOR MAIL SORTING EQUIPMENT AND LETTER GUIDANCE INSERTION FLAP EQUIPPING SUCH A BENCH

[75] Inventor: Claude Pavie, Houilles, France

[73] Assignee: Hotchkiss-Brandt Sogeme H.B.S., Paris, France

[21] Appl. No.: 521,829

[22] Filed: Aug. 10, 1983

[30] Foreign Application Priority Data

Aug. 13, 1982 [FR] France ............................ 82 14102

[51] Int. Cl.[4] .................... B65G 47/04; B65G 47/22; B65G 47/34; B65G 47/53; B65G 47/84

[52] U.S. Cl. ............................ 198/469.1; 198/408; 198/535; 271/186; 271/315; 414/104

[58] Field of Search ................ 414/32, 104, 112, 330; 209/900; 198/404, 408, 461, 480, 535, 536; 271/184–187, 225, 295, 315

[56] References Cited

U.S. PATENT DOCUMENTS 4,050,751 9/1977 Stange ........................ 271/295 X
4,088,314 5/1978 Phillips ...................... 271/187 X
4,145,038 3/1979 Mol ............................ 271/315 X
4,244,565 1/1981 Geier .......................... 271/187 X

*Primary Examiner*—Leslie J. Paperner
*Assistant Examiner*—Lyle Kim
*Attorney, Agent, or Firm*—Oblon, Fisher, Spivak, McClelland & Maier

[57] ABSTRACT

The invention relates to an insertion flap for guiding letters during their insertion into the compartments of a rotary drum. It is a question of the axial insertion into the compartment of a drum rotating at an angular velocity $\Omega$ of a letter arriving at speed v. For this purpose, a flap takes up the letter at the interface between the conveying system and the drum and the flap pivots in the rotation direction of the drum at the same angular velocity as the latter and consequently accompanies the latter, whilst increasing the available insertion time before suddenly returning to its initial position for recommencing a new cycle. This makes it possible to compensate rapid speed fluctuations of the drum and bench, whilst a calculation of the departure time for each letter makes it possible to compensate the slow speed fluctuations of the drum and bench.

10 Claims, 6 Drawing Figures

DISPLACEMENT BENCH FOR MAIL SORTING EQUIPMENT AND LETTER GUIDANCE INSERTION FLAP EQUIPPING SUCH A BENCH

BACKGROUND OF THE INVENTION

The present invention relates to a mail sorting displacement bench, as well as to an insertion flap for guiding letters, more specifically intended for the guidance of letters driven by a belt system, and which have to be individually introduced into each compartment of a rotary drum, before being oriented towards the actual sorting machine.

As a result of the speeds required, the variable dimensions of the letters and the various tolerances, this operation of transferring each individual letter into a rotating drum compartment is far from easy. It is a question of axially introducing into a compartment of a drum rotating at an angular velocity $\Omega$, a letter arriving at speed v, whereby it is motorized between two gripped belts. The letter has a length L and a thickness e. The drum is subdivided into n circular sectors, whose walls form an angle (a) between them. The letters then drop into the compartments moving under the drum. The following difficulties are encountered. The angular velocity $\Omega$ is subject to slow variations and faster variations between the individual sectors. The slow variations or deviations, or the regulating errors can be estimated as $\pm 5\%$. The fast variations are estimated as $\pm 10\%$. In addition, v can be subject to more or less variations, as a function of the care taken in the motorization of the belts. Finally, the letter must be synchronized with the movement of the drum.

The object of the present invention is to solve all these problems of guiding the letter during its insertion into the compartment, as well as the problems linked with controlling the frequency and phase of the arrival and insertion of the letters. It more specifically relates to a displacement or movement bench, having a conveying system, with a natural velocity v, receiving the letters from a destacking magazine and introducing them into moving receptacles. It also relates to an insertion flap, whose function is to increase the time interval available for the insertion of the letters. The invention relates to a displacement bench equipped with such a flap and having a control system linking the operation of the destacker with the operation of the drum.

BRIEF SUMMARY OF THE INVENTION

The present invention consequently relates to an insertion flap for guiding letters, during their insertion into the compartments of a rotary drum, wherein the said flap has an axis ensuring its pivoting in the drum rotation direction by an angle $\alpha$, during which it accompanies the letter, thus increasing the available time interval for the insertion of the letter into the corresponding compartment of the drum.

BRIEF DESCRIPTION OF THE DRAWINGS

The invention is described in greater detail hereinafter relative to non-limitative embodiments and with reference to the attached drawings, wherein show.

The same elements carry the same references throughout the drawings.

DESCRIPTION OF THE PREFERRED EMBODIMENTS

Figure 1:
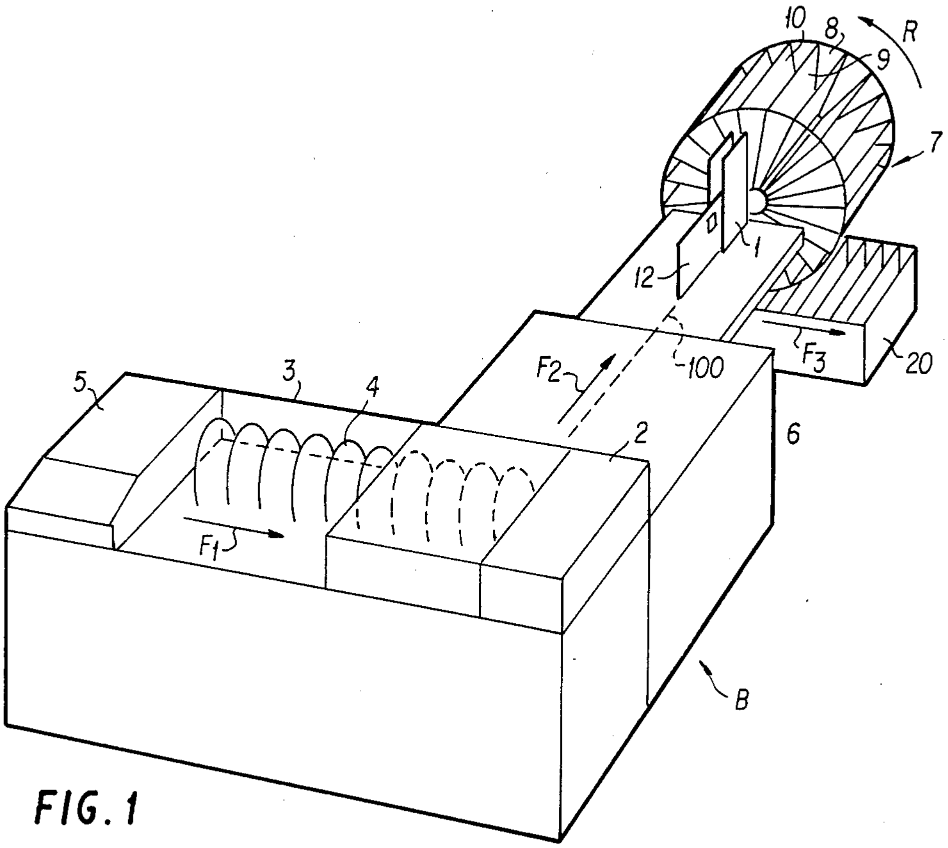
FIG. 1 an explanatory diagram showing the architecture of a supply machine equipped with an insertion flap according to the invention.

FIG. 1 diagrammatically shows a displacement bench B, equipped with an insertion flap 1 according to the invention. This bench essentially comprises a per se known destacker 2. It can more particularly be a drum having a perforated wall against which the letters are sucked and wind up one by one when the drum is placed under a vacuum and before being driven by a belt conveying system 100.

The destacker 2 is supplied by means of a magazine 3, which e.g. has fingers 4, between which the operator places the letters. As is shown by the arrow $F_1$, the fingers 4 advance towards the destacker and cooperate in conventional manner with various not shown wedging roller systems. A control and display console 5 makes it possible to follow the operations, the destacking speed being fixed by the drum.

The destacked letters are then taken up by a belt conveying system 100, arrow $F_2$ giving the displacement direction of the letters, which move along the reading module 6 having devices for stabilizing the letters, the stacker for rejected items and in particular the indexing reading head. These components are known and consequently not shown. They are grouped within the reading module 6. At the outlet from the latter, the letters continue their travel towards drum 7. The latter is subdivided into a plurality of sectors 8, defined by side walls such as 9 and 10. There are the same number of sectors as there are compartments. These sectors or compartments have a truncated V-shaped corss-section, whose point is located on the axis of drum 7, parallel to the drive axis of letters 12.

An insertion flap 1 according to the invention is positioned at the interface between the conveying system for the letters 12 and the drum 7. This flap follows the movement of the drum in such a way that each letter is guided by it for an adequate time to enable its complete insertion into compartment 8, itself rotated and without striking against the edge of one or other of the side walls 9 and 10. When insertion is at an end, the compartment continues its path, the flap returns to its initial position in order to face a new compartment and then a new cycle is commenced. The drum rotation direction is indicated by arrow R. As soon as the letter-containing compartment is in the low or bottom position (discharge position) opposite to its loading position, the letter drops by gravity into a bin 20, driven in the manner indicated by arrow $F_3$, towards a not shown sorting machine.

Figure 2:
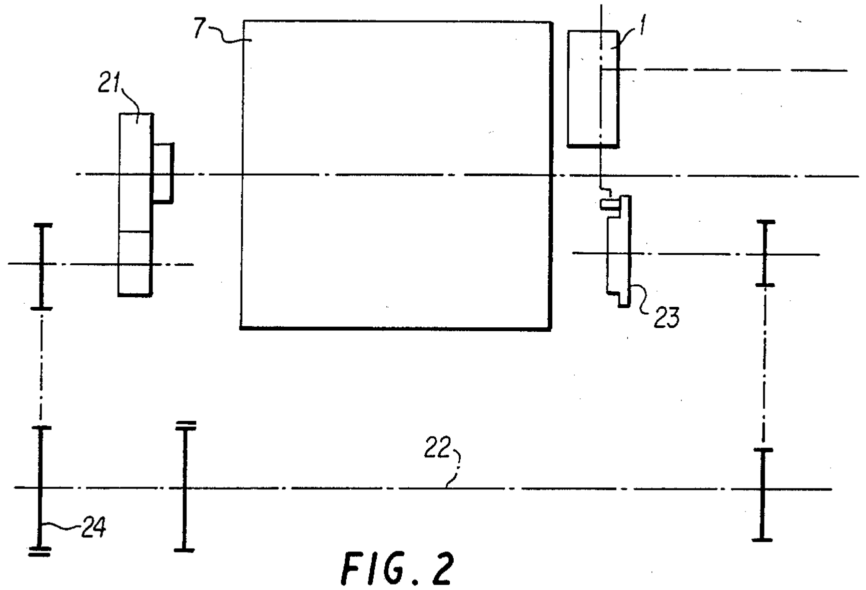
FIG. 2 a diagram showing the way in which the drum drive means on the one hand and the insertion flap on the other are connected.

FIG. 2 diagrammatically shows the mechanical connections interconnecting the drive means. On the other hand clutch 21 of drum 7 is connected by a chain system 22 to a cam 23, which drives insertion flap 1 in its hereinbefore defined reciprocating movement and which will be explained in greater detail hereinafter. This connection system by chain 22 is connected to the drive system 24 of the not shown sorting machine. The drum is also linked with the drive system 24. Thus, there is a synchronism between the different components forming the sorting equipment.

Figure 3:
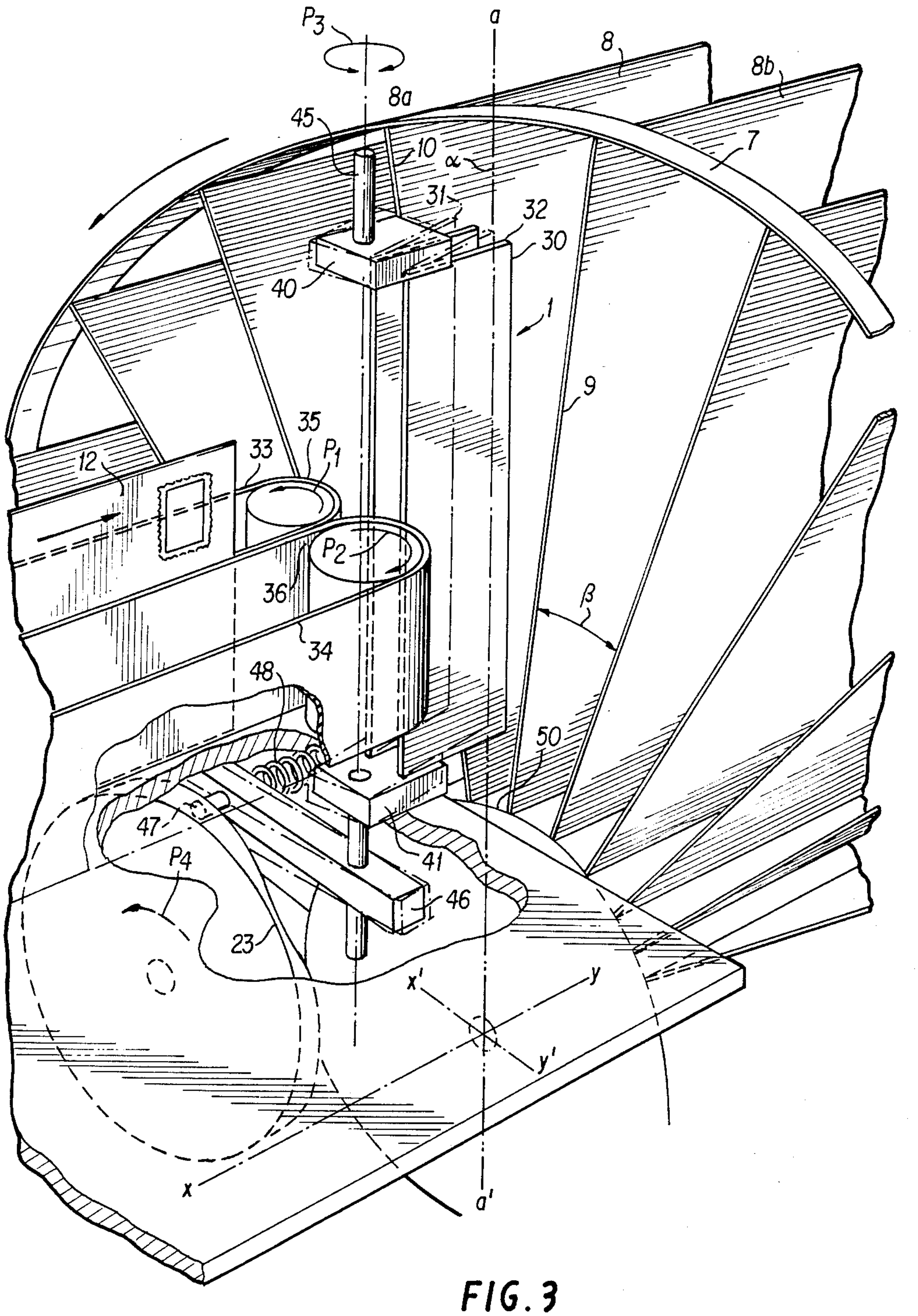
FIG. 3 a detail of the insertion flap according to the invention.

FIG. 3 is a diagram illustrating the insertion flap according to the invention, as well as its cooperation with drum 7. Flap 1 is constituted by two flanges 30, 31, defining a guide slide 32, into which is introduced the letter 12 supplied by the conveying system. The conveying system is e.g. constituted by two belts 33, 34, driven by means of two motorized pulleys 35, 36, whose respective rotation directions are indicated by arrows $P_1$ and $P_2$. The two flanges 30, 31 are joined to an upper base 40 and a lower base 41, which rigidifies the assembly. A spindle 45 passes through these two bases in such a way that when it is rotated (arrow $P_3$), it displaces the two flanges 30, 31 in its movement. This spindle 45 is also joined to a plate 46, carrying at one of its ends a roller 47 and a return spring 48. The cam 23 is rotated in the direction of arrow $P_4$ by chain 22 (FIG. 2). The profile of cam 23 cooperates with roller 47 and spring 48 to impart a reciprocating movement to flap 1.

As has been stated hereinbefore, each compartment 8 has a truncated V-shaped cross-section and is defined on the one hand by two intermediate side walls 9, 10 respectively with the preceding compartment 8*a* and the following compartment 8*b*, and on the other hand by a base 50, whose width is a function of the internal diameter of drum 7 and the number of compartments distributed over the circumference of drum 7. According to one embodiment, the drum is subdivided into 18 sectors, i.e. 18 compartments, whose walls form between them an angle $\beta$ equal to 20°.

The axis aa' of each compartment, particularly compartment 8 used for illustrating the operation of the means according to the invention, passes through the intersection O of two axes (xy) and (x', y') of drum 7. According to the invention, the profile of cam 23 is determined in such a way that during a given time the slide 32, defined by the two flanges 30, 31 of flap 1, follows the rotary movement of drum 7 at the same speed as the latter. The displacement of flap 1 is limited to an angle $\alpha$, permitting the flap to follow the compartment during most of its passage. At the end of the accompanying path of flap 1, roller 47 is maintained on cam 23 by return spring 48, which returns flap 1 to its initial position, to enable it to take up a new letter, in order to guide the same during its insertion in the following compartment 8*b*. During the accompanying phase of flap 1, the axis of slide 32 essentially follows the axis (aa') of the compartment in question.

Figure 4:
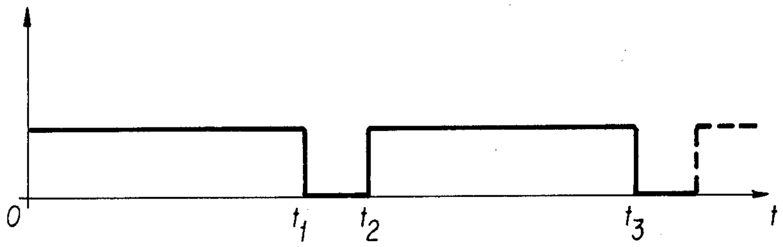
FIGS. 4 and 5 explanatory diagrams illustrating the operation of the flap according to the invention.
Figure 5:
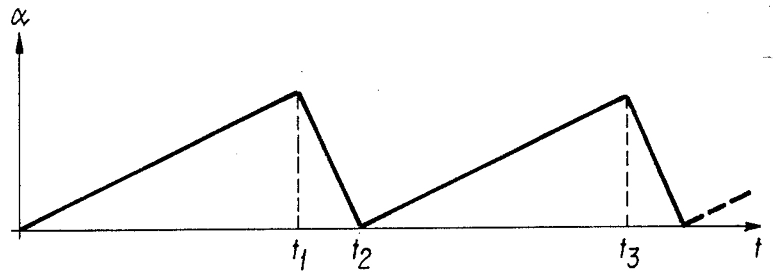

FIGS. 4 and 5 illustrate the accompanying movement of flap 1. FIG. 4 shows two time windows corresponding to the insertion time of the letters into the drum $T_1$ on the one hand and $T_3$-$T_2$ on the other, between which there is the time $T_2$-$T_1$ for the return of the flap to its initial position. The cycle is repeated the same number of times as there are compartments to be filled. FIG. 5 is a diagram showing the movement of the flap as a function of time. The angle $\alpha$ taken by the flap in its accompanying phase follows a rising ramp during the time $T_1$ . . . $T_3$-$T_2$, and a more steeply downwardly sloping ramp during the time $T_2$-$T_1$ . . . $T_4$-$T_3$, etc., corresponding to the return of the flap to its initial position, which precedes the taking up of a new letter.

In the embodiment described, for a sector passage time of 1/6 second, i.e. 167 milliseconds, the accompaniment takes place for a time $T_1$, $T_3$-$T_2$ equal to 142 milliseconds and the return for a time $T_2$-$T_1$ equal to 25 milliseconds. Thus, there is an adequate margin for allowing the synchronization variations caused by the length differences of the letter encountered at the time of inserting into the drum 7. Thus, at the chosen speed V of 3.6 m/sec, a letter of length L=292 mm only takes 81 milliseconds for entering drum 7. This is to be compared with the 142 milliseconds corresponding to the time interval available for insertion letters as a result of the realization of flap 1 according to the invention. Such a device has a further advantage, namely that it provided independence from the thickness of the letters and the rapid speed fluctuations of the drum. Thus, as has been stated hereinbefore, the axis of the flap follows the theoretical centre of the sector or compartment, but tolerates variations of ±30% from the real position of the compartment with respect to its theoretical position. The difference between said 30% and the drum speed variations considered to be ±10%, makes it easy to absorb the tolerances between the movements of the drum and those of the flap, as well as the non-linearities which may occur in the movement of the latter. Thus, in so far as the letter enters slide 32 of flap 1, it necessarily enters drum 7.

Figure 6:
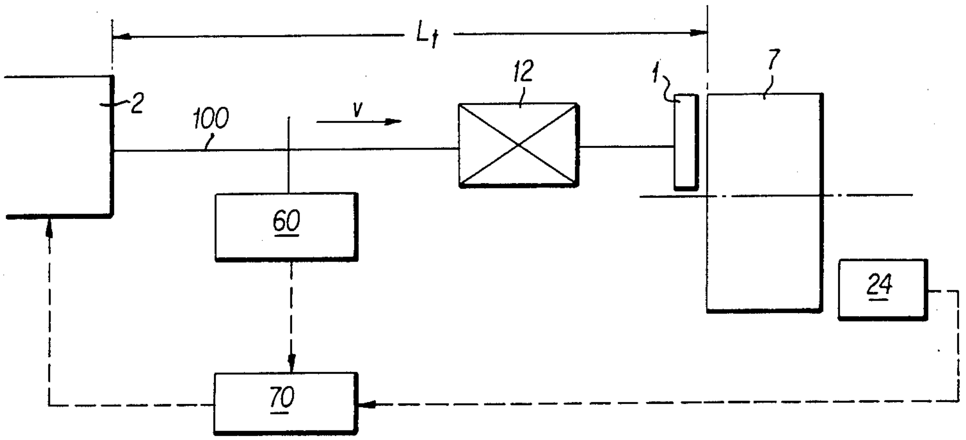
FIG. 6 diagrammatically, a control system synchronizing destacking with the drum rotation movement.

FIG. 6 diagrammatically shows a control system synchronizing destacking with the movement of drum 7, whilst taking account of variations in the drum speed, as well as variations in the speed of the conveying system. The letters 12 are moved from destacker 2 to drum 7 at a speed v. This speed can suffer from slow variations of about 5% and fast variations of ±1%. To obtain independence of these variations and the slow variations of drum 7, the letter/drum synchronization is obtained by optimizing the instant of destacking each individual letter.

The problem consists of calculating the theoretical starting time of the letter in order to ensure that its front arrives at the end of the bench at the same time as the passage of a compartment in front of the slide of insertion flap 1 in the initial starting position, as defined hereinbefore. In order to fulfil the function, use is made of a coder 24, called the drum coder, which is synchronous with the latter and which supplies so-called drum pulses (i.e., pulses delivered in synchronism with the angular speed of the drum) at a rate of 6 pulses per second in the case of the presently described embodiment. The destacking pulses are at the same frequency as the drum pulses, namely 1 pulse per sector of the drum, whereby the destacking and the drum pulses are not necessarily in phase, as will be shown hereinafter.

Over the path of the letters, a coder 60 or bench coder, synchronous with the bench and the conveying belts, supplies pulses at 4000 Hz for a speed of 3.6 m/sec. Between two pulses of bench coder 60 a letter covers a fixed distance, no matter what the bench speed. Thus, the times given by the coder 60 represent a distance measurement unit. Thus, the travel of the total length $L_t$ of the bench corresponds to a number N of pulses of coder 60. This travel approximately takes place during a number k of pulses of the drum coder 24.

A number p of pulses of coder 60 corresponds to the distance covered by a letter between two of the drum pulses, the number p being called "steps" in the remainder of the description. Between two pulses of the drum coder 24, it is possible to count the number of pulses, i.e. the number of steps. If for the travel $L_t$, the total number of steps kp was equal to the number N, there would be no problem of frequency and phase synchronism. In fact there is always a displacement, whose expression is:

$$d=kp-N$$

k being an integer equal to 4, 5 or 6, bearing in mind possible fluctuations in the speed and length of the bench and in which d must always be equal to or higher than 0. The calculations of d are performed by a microprocessor 70 during the 1/6 sec preceding the departure of the letter, maintaining the hypotheses used in the previously described embodiment. The pulse triggering the destacking of a letter is displaced with respect to the drum pulse, as a function of the calculated value of d. Under these conditions, the unstacked letter faces the reception compartment in an optimum position to enable the insertion flap according to the invention to perfectly fulfil its accompanying function with respect to the letter, in such a way that the latter is always substantially centered with respect to the compartment during its passage in front of the conveying path.

A description has been given of an embodiment using a single bench, equipped with its insertion flap and cooperating with a single drum. However, to increase speeds, it is also possible to provide at least one second displacement bench in parallel. In this case, each of the drums ensures the filling of every other compartment of the sorting machine bin 20.

The present invention can be used in any postal sorting equipment, where there is an interface problem between a letter movement system using belts and a letter reception compartment system in the form of a rotary drum.

What is claimed is:

1. Apparatus for feeding documents of varying size, said apparatus comprising:

(a) a conveying means for feeding individual documents at spaced intervals in a first direction;

(b) a drum subdivided into a plurality of radial sectors;

(c) a drive means for rotating said drum about an axis extending in said first direction;

(d) a movable insertion flap positioned between said conveying means and said drum in position to accept one of the documents at a time from said conveying means and to insert each successive document into a successive one of said plurality of radial sectors as said drive means rotates said drum; and (e) an insertion flap drive means operatively connected to said insertion flap for moving said insertion flap in synchronism with each successive one of said plurality of radial sectors long enough for one of the documents to be transferred from said insertion flap to said one of said plurality of radial sectors and for returning said insertion flap to its starting position in time to accept the next successive document from said conveying means and to repeat the cycle.

2. Apparatus as recited in claim 1 wherein the apparatus is adapted to feel letters of varying sizes.

3. Apparatus as recited in claim 1 wherein said conveying apparatus comprises a belt conveying system.

4. Apparatus as recited in claim 1 and further comprising:

(a) a bin disposed beneath said drum, said bin having a plurality of upwardly open compartments, and (b) means for moving said bin beneath said drum such that the documents in said radial sectors in said drum drop into successive compartments in said bin.

5. Apparatus as recited in claim 1 wherein said drive means for rotating said drum is operatively connected to said insertion flap drive means.

6. Apparatus as recited in claim 1 wherein said insertion flap comprises two flanges defining a guide slide into which successive documents are introduced by said conveying means.

7. Apparatus as recited in claim 6 wherein:

(a) said flanges are mounted on a base and (b) said base is mounted for pivotal movement about an axis perpendicular to said first direction.

8. Apparatus as recited in claim 7 wherein said flap drive means comprise:

(a) a rotary cam operatively driven by said means for rotating said drum and (b) a cam follower operatively connected to said base so that rotary movement of said rotary cam causes reciprocal motion of said base.

9. Apparatus as recited in claim 8 wherein said rotary cam is shaped so that:

(a) during a first time interval, said guide slide follows the rotaty movement of said drum at the same speed as said drum and, (b) during a second, shorter time interval, said guide slide returns to its starting position.

10. Apparatus as recited in claim 1 and further comprising compensating means for compensating for variations in the speeds of said drive means for rotating said drum and said insertion flap drive means, said compensating means comprising:

(a) a drum coder which supplies drum pulses which are synchronous with the angular speed of said drum;

(b) a bench coder which supplies bench pulses which are synchronous with the linear speed of said conveying means; and (c) a microprocessor means for controlling said conveying means so that the leading edge of each individual document arrives at the front of said insertion flap at the same time that one of said radial sectors arrives in position to accept the document.

* * * * *